US008723357B2

(12) United States Patent
Spencer et al.

(10) Patent No.: US 8,723,357 B2
(45) Date of Patent: May 13, 2014

(54) POWER SUPPLY HAVING LOW QUIESCENT CONSUMPTION

(75) Inventors: John Spencer, Fort Collins, CO (US); Garland Lee, Windsor, CO (US); Eugene Dvoskin, Broomfield, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 395 days.

(21) Appl. No.: 13/260,523

(22) PCT Filed: Jul. 24, 2009

(86) PCT No.: PCT/US2009/051697
§ 371 (c)(1),
(2), (4) Date: Sep. 26, 2011

(87) PCT Pub. No.: WO2011/011015
PCT Pub. Date: Jan. 27, 2011

(65) Prior Publication Data
US 2012/0025610 A1  Feb. 2, 2012

(51) Int. Cl.
H02J 3/14 (2006.01)
(52) U.S. Cl.
USPC .......................................... 307/31
(58) Field of Classification Search
USPC .......................................... 307/31
See application file for complete search history.

(56) References Cited

U.S. PATENT DOCUMENTS

| 5,241,680 A | 8/1993 | Cole |
| 5,548,763 A | 8/1996 | Combs |
| 5,765,001 A | 6/1998 | Clark |
| 6,065,124 A | 5/2000 | Lee |
| 6,092,207 A | 7/2000 | Kolinski |
| 6,098,175 A | 8/2000 | Lee |
| 6,496,390 B2 | 12/2002 | Yang |
| 6,633,987 B2 | 10/2003 | Jain |
| 6,768,224 B2 | 7/2004 | Shen |
| 6,904,506 B2 | 6/2005 | Wu |
| 6,920,573 B2 | 7/2005 | Lee |
| 7,007,175 B2 | 2/2006 | Chang |
| 7,213,159 B2 | 5/2007 | Wu |
| 2005/0219868 A1 | 10/2005 | Inukai |
| 2006/0090090 A1 | 4/2006 | Perng |

FOREIGN PATENT DOCUMENTS

| JP | 2000-152623 | 5/2000 |
| JP | 2000-358370 | 12/2000 |
| JP | 2004-208379 | 7/2004 |

Primary Examiner — Robert L. DeBeradinis

(57) ABSTRACT

Electronic circuitry and methods are provided. Electrical energy is coupled to a transformer by way of line filter of a power supply. A clipper circuit limits the alternating-current voltage applied to the primary side. A voltage tripler receives output from the secondary side of the transformer and a resulting voltage is coupled to a voltage regulator. At least one regulated direct-current voltage is output to a load and is maintained while a current pulse is applied to a predetermined device. The electronic circuitry conforms to pending power conservation requirements for computers and other equipment.

15 Claims, 3 Drawing Sheets

POWER SUPPLY HAVING LOW QUIESCENT CONSUMPTION

BACKGROUND

Numerous desktop computers and other devices are designed to assume a low power-consumption or "deep standby" mode during non-use or other idle periods. Applicable laws and regulations in this area are becoming more stringent as the need to conserve resources is recognized as essential to a sustainable global community. However, many existing power supplies and other circuit designs cannot conform to present or pending power conservation directives. The present teachings address the foregoing concerns.

BRIEF DESCRIPTION OF THE DRAWINGS

The present embodiments will now be described, by way of example, with reference to the accompanying drawings, in which.

DETAILED DESCRIPTION

Introduction

Means and methods for conserving electrical energy within a computer or other load are provided by the present teachings. Electrical energy is coupled to a transformer by way of line filter of a power supply. A clipper circuit limits the alternating-current voltage applied to the primary side of the transformer. A voltage tripler receives output from the secondary side of the transformer and a resulting unregulated voltage is coupled to a voltage regulator. At least one regulated direct current voltage is output to a load and is maintained while a current pulse is applied to a predetermined device. Electronic circuitry of the present teachings conforms to pending power conservation requirements for computers and other equipment.

In one embodiment, an electronic circuit includes a pair of diodes configured to define a voltage clipper. The electronic circuit also includes a transformer having a primary side and a secondary side, the primary side electrically connected across the voltage clipper. The electronic circuit also includes a voltage tripler electrically coupled to the secondary side of the transformer and configured to output an unregulated voltage. The electronic circuit further includes a voltage regulator electrically coupled to the voltage tripler and configured to output one or more regulated direct-current voltages.

In another embodiment, a method includes clipping an alternating-current voltage applied to a primary side of a transformer using a voltage clipper. The method also includes tripling a voltage output from a secondary side of the transformer using a voltage tripler. The method additionally includes electrically coupling an output from the voltage tripler to a voltage regulator using a diode. The method further includes outputting at least one regulated direct-current voltage from the voltage regulator to a load.

First Illustrative Embodiment

Figure 1:
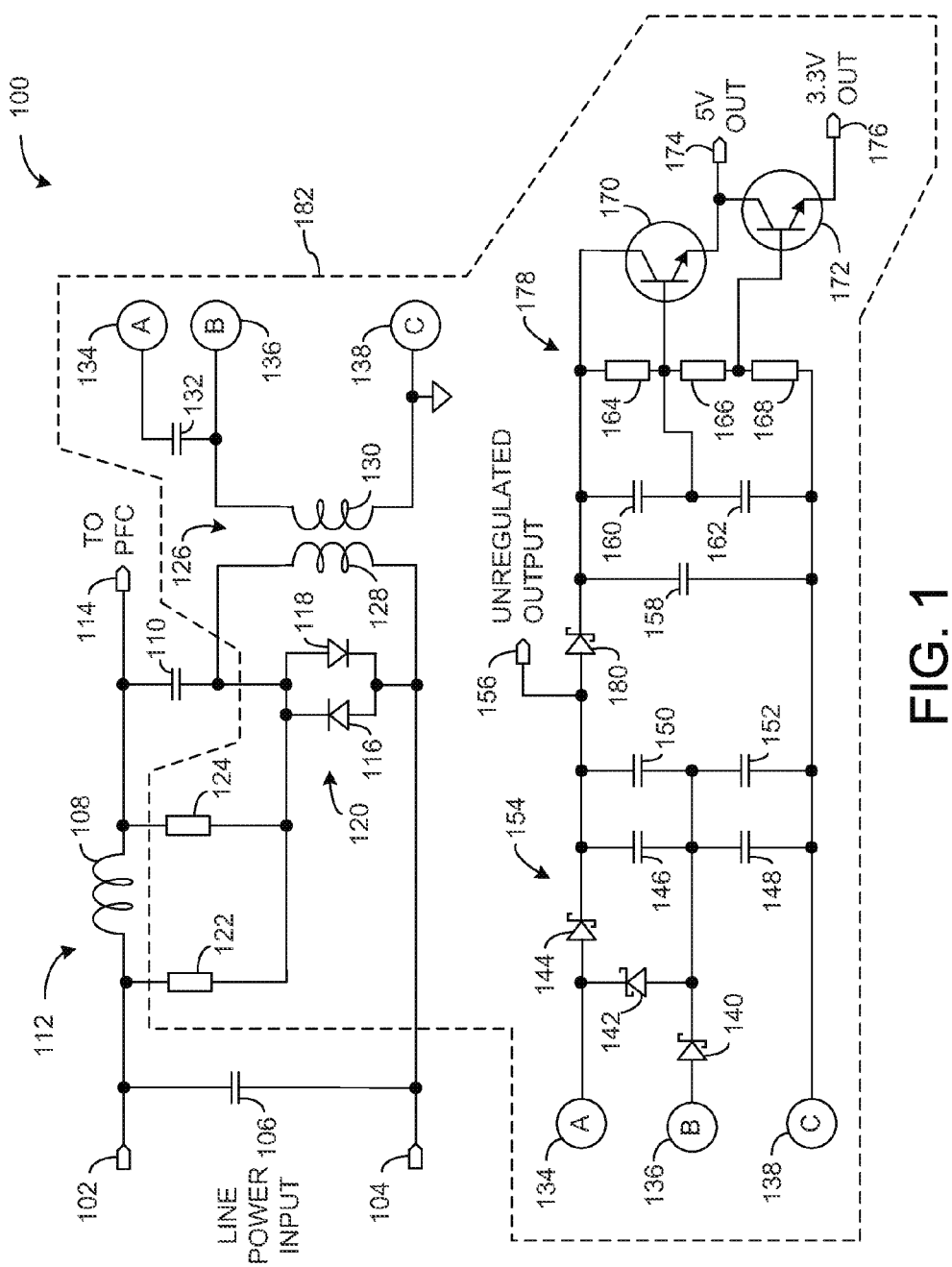
FIG. 1 depicts a schematic diagram of electronic circuitry according to one embodiment.

Reference is now directed to FIG. 1, which depicts a schematic diagram of electronic circuitry 100. The circuitry 100 is illustrative and non-limiting with respect to the present teachings. Thus, other circuits can be configured and/or operated in accordance with the present teachings.

The circuitry 100 includes a pair of power input nodes 102 and 104 that receive alternating-current (AC) electricity from an external source such as a power distribution utility. For non-limiting example, a potential of two-hundred thirty volts root-mean-square (RMS) at fifty Hertz frequency is provided between nodes 102 and 104 from a utility source. Electricity having other voltage or frequency specifications can also be used.

The circuitry 100 also includes a capacitor 106, an inductor 108 and a capacitor 110 that are configured to define a pi-type line filter 112 of a power supply. The line filter 112 is of known design and operation to one having ordinary skill in the electrical arts. The line filter 112 is coupled to receive electrical energy from the input nodes 102 and 104, and is defined by an output node 114. The output node 114 can be connected to other portions (not shown) of the power supply such as power-factor correction circuitry, etc. Circuitry according to the present teachings is described hereinafter.

The circuitry 100 also includes a diode 116 and a diode 118 that are electrically coupled in parallel, complimentary polarity orientation so as to define a bipolar (or bidirectional) voltage clipper (or limiter) 120. Each of the diodes 116 and 118 is defined by a silicon diode having a typical forward voltage of zero-point-six volts. Other suitable diodes or voltage clipper configurations can also be used. The voltage clipper 120 is electrically connected to node 104, and is electrically coupled to node 114 by way of the capacitor 110. The voltage clipper 120 is also electrically coupled to opposite ends of the inductor 108 by way of respective resistors 122 and 124.

The circuitry 100 also includes a transformer 126 having a primary side (inductor) 128 and a secondary side (inductor) 130. The transformer 126 is connected across the voltage clipper 120 such that, during normal operation, alternating-current potential applied to the primary side 128 is limited to about plus-and-minus zero-point-six volts (i.e., zero-point-six volts absolute value). In one embodiment, the transformer 126 is defined by a primary side 128 direct-current resistance of about ten Ohms, a primary side 128 inductance of about sixty-eight milliHenrys, a turns ratio of eight, and a secondary side 130 inductance of about four-point-three-five Henrys. Thus, in one embodiment, the transformer 126 is selected such that an alternating-current input to the primary side 128 of zero-point-six volts peak results in an output from the secondary side 130 of about four-point-eight volts peak under no-load conditions.

The circuitry 100 also includes a capacitor 132 that couples one end of the secondary side 130 of the transformer 126 to a node 134 (labeled "A"), while that same end of the secondary side 130 is also coupled to a node 136 (labeled "B"). The opposite end of the secondary side 130 is connected to a node 138 (labeled "C").

The circuitry 100 further includes three respective Schottky diodes 140, 142 and 144, and four respective capacitors 146, 148, 150 and 152. The Schottky diodes 140-144, and the capacitors 132 and 146-152, are configured to define a voltage tripler 154. The voltage tripler 154 receives electrical output from the transformer 126 and provides an unregulated electrical potential between node 138 and an output node 156 that is about three times greater in peak voltage value than that present between nodes 136 and 138.

The circuitry 100 also includes a filter capacitor 158, and a pair of capacitors 160 and 162 arranged in series-circuit configuration. Additionally, the circuitry 100 includes three resistors 164, 166 and 168 arranged to define a voltage divider. The circuitry 100 includes a transistor 170 and a transistor 172 that are respectively coupled to be biased by way of the three resistors 164-168 (i.e., the voltage divider).

The transistor 170 is configured provides a regulated direct-current output voltage of about five volts at a node 174, while the transistor 172 is configured to provide a regulated direct-current output voltage of about three-point-three volts at a node 176. The capacitors 158-162, the resistors 164-168 and the transistors 170-172 are collectively configured to define a voltage regulator 178. The voltage regulator 178 receives electrical energy from the voltage tripler 154 by connection to node 138 and by electrical coupling to node 156 through a Schottky diode 180. The Schottky diode 180 provides temporary voltage isolation when unregulated voltage at node 156 is used to change the state of a latching relay (e.g., latching relay 222 of FIG. 2) and capacitor 158 becomes the current source for voltage regulator 178 during this event. It is noted that the transistor 172 is configured to derive the regulated voltage at node 176 from the regulated voltage at node 174.

The respective circuitry 100 components 116-180, inclusive, collectively define a co-auxiliary power supply 182 in accordance with the present teachings. The co-auxiliary power supply 182 is configured to operate with less than two-hundred milliWatts of power consumption. Table 1 below provides illustrative and non-limiting values for the components of the co-auxiliary power supply 182.

TABLE 1

Co-Auxiliary Power Supply 182

| Element/Device | Value/Model | Notes/Vendor |
| --- | --- | --- |
| Diode 116 | MURS120 | ON Semiconductor |
| Diode 118 | MURS120 | ON Semiconductor |
| Resistor 122 | 1M Ohms | (any) |
| Resistor 124 | 400k Ohms | (any) |
| Transformer 126 | ST-3-28 | Signal Transformer, Inc. |
| Capacitor 132 | 22 uF | 16 V |
| Diode 140 | BAT54 | Vishay Americas |
| Diode 142 | BAT54 | Vishay Americas |
| Diode 144 | BAT54 | Vishay Americas |
| Capacitor 146 | 22 uF | 16 V |
| Capacitor 148 | 22 uF | 16 V |
| Capacitor 150 | 22 uF | 16 V |
| Capacitor 152 | 22 uF | 16 V |
| Capacitor 158 | 470 uF | 16 V |
| Capacitor 160 | 1 uF | 16 V |
| Capacitor 162 | 1 uF | 16 V |
| Resistor 164 | 191k Ohms | (any) |
| Resistor 166 | 47.5k Ohms | (any) |
| Resistor 168 | 110k Ohms | (any) |
| Transistor 170 | MMBT3904 | Fairchild Semiconductor |
| Transistor 172 | MMBT3904 | Fairchild Semiconductor |
| Diode 180 | BAT54 | Vishay Americas |

First Illustrative System

Figure 2:
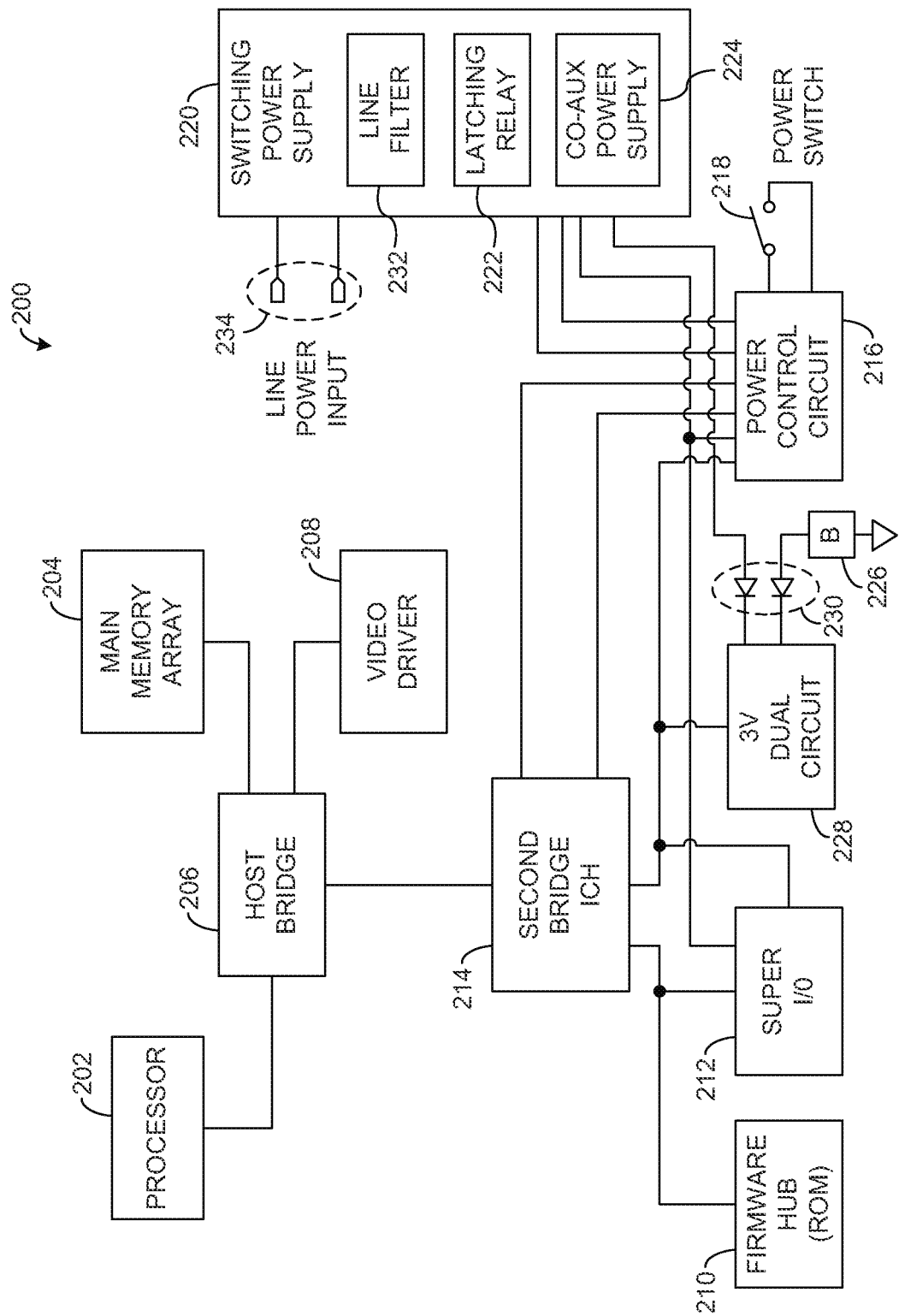
FIG. 2 depicts a block diagram of a computer system according to one embodiment.

FIG. 2 is a block diagram depicting a computer 200 according to an embodiment of the present teachings. The computer 200 is illustrative and non-limiting in nature, and is intended to depict one of any number of possible applications of the present teachings. Thus, other computers and systems can also be defined and used in accordance with the present teachings.

The computer 200 includes a processor 202, main memory array 204, host bridge 206 and video driver 208 that are respectively configured and operative as is known of one having ordinary skill in the computer arts. The computer 200 also includes a firmware hub 210 defined by read-only memory (ROM) including program code executable by the processor 202. The computer 200 further includes input/output 212, and a second bridge ICH 214. The second bridge ICH 214 bridges a primary expansion bus from the host bridge 206 to various secondary buses, such as a PCI and a low pin count (LPC) bus.

In accordance with some embodiments, the second bridge ICH 214 comprises an Input/Output Controller Hub (ICH) manufactured by Intel Corporation of Chandler, Ariz. In the embodiment depicted in FIG. 2, the primary expansion bus between the host bridge 206 and the second bridge ICH 214 comprises a Hub-link bus, which is a proprietary bus of the Intel Corporation. However, computer system 200 is not limited to a chipset manufactured by Intel, and thus other suitable chipsets and therefore other suitable buses between the bridge devices can be used.

The computer 200 includes a power control circuit 216 that is configured to coordinate the provision of electrical power to the other various circuits and sub-systems of the computer 200 during normal (full-power) operations. The power control circuit 216 is also configured to control power conservation within the computer 200 by shutting off electrical power to various resources of the computer 200 during deep standby operation. The power control circuit 216 is also configured to issue signals as needed in order to transition between deep standby, normal or other operating modes. The power control circuit 216 is coupled to a manually-actuated switch 218 that controls start-up and shut-down of the computer 200 in accordance with user input.

The computer 200 also includes a switching power supply 220. The power supply 220 includes a latching relay 222 that is controlled in accordance with deep standby and wake-up (i.e., full power) modes of operations. The latching relay 222 is configured to enable and disable the flow of electrical energy within at least a portion of the power supply 220. The power supply 220 also includes a co-auxiliary power supply 224 according to the present teachings. In one embodiment, the co-auxiliary power supply 224 is defined and configured as described above in regard to the co-auxiliary power supply 182. Other co-auxiliary power supplies can also be used. The co-auxiliary power supply 224 is configured to provide three-point-three volts and five volts of electrical energy so as to enable a transition from a deep standby mode to fully-operational mode for the computer 200. The switching power supply 220 and the co-auxiliary power supply 224 each receive utility line power through a line filter 232 by way of a pair of input nodes 234.

The computer 200 also includes a battery 226 configured to provide electrical energy as needed in order to transition from a deep standby mode to fully operational (i.e., awake) mode for the computer 200. The computer 200 include a three-volt dual circuit 228 configured to receive direct-current (DC) electrical potential from each of the co-auxiliary power supply 224 and the battery 226 by way of a pair of respective Schottky steering diodes 230.

It is noted that the Schottky steering diodes 230 results in about a zero-point-three volt drop in the respective potentials being provided to the three-volt dual circuit 228. The three-volt dual circuit 228 is also configured to provide three volts to the power control circuit 216 and other resources of the computer 200 as needed to power a Real Time Clock (RTC, not shown) and to enable deep standby and full-power (i.e., awake) modes of operation. Illustrative normal operation of the computer 200 is described hereinafter.

First Illustrative Method

Figure 3:
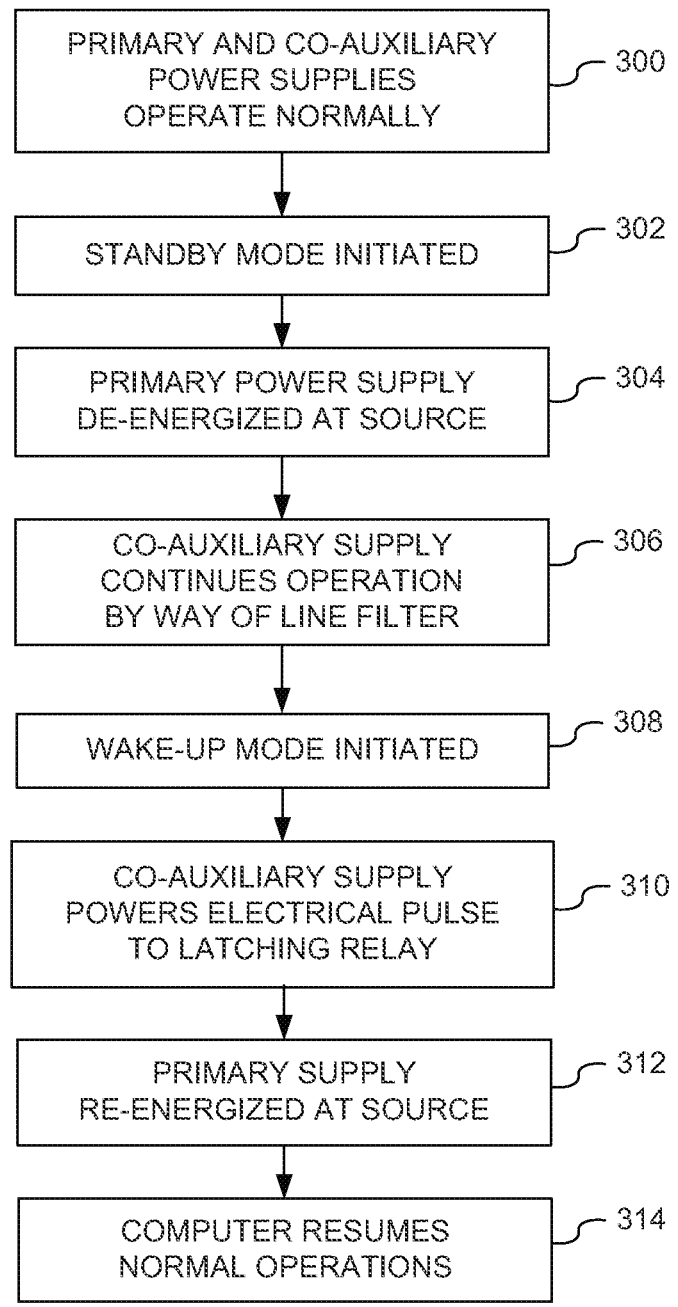
FIG. 3 is a flow diagram depicting a method according to one embodiment.

FIG. 3 is a flow diagram depicting a method according to one embodiment of the present teachings. The method of FIG. 3 includes particular operations and order of execution. However, other methods including other operations, omitting one or more of the depicted operations, and/or proceeding in other orders of execution can also be used according to the present teachings. Thus, the method of FIG. 3 is illustrative and non-limiting in nature. Reference is also made to FIG. 2 in the interest of understanding the method of FIG. 3.

At 300, primary and co-auxiliary power supplies for a computer (or other load) operate normally. For purposes of non-limiting illustration, it is assumed that a switching power supply 220 and a co-auxiliary power supply 224 operate contemporaneously, receiving electrical energy from a utility line source by way of a pair of input nodes 234.

At 302, a standby mode of operation is initiated. For purposes of the ongoing illustration, it is assumed that a computer 200 has been left idle for some predetermined period of time and is automatically assuming a deep standby condition. Transition to the deep standby mode can include any number of required or desired operations, such as recording the present operating state to memory 204, cessation of network communications via input/output 212, downloading register contents from a processor 202 to a non-volatile memory, etc.

At 304, the primary power supply is de-energized at the source. For purposes of illustration, it is assumed that the latching relay 222 is actuated into a reset (i.e., open switch) condition, thus disconnecting line utility power from at least a portion of the switching power supply 220. The switching power supply 220 is now effectively inactivated and does not provide any electrical energy to the balance of the computer 200.

At 306, the co-auxiliary power supply continues normal operation by way of the line filter. For purposes of illustration, it is assumed that the co-auxiliary power supply 224 continues to receive electrical energy from a utility source by way of the line filter 232. The co-auxiliary power supply 224 also continues to provide three-point-three volts of direct-current potential that is electrically coupled to the three-volt dual circuit 228, and five volts of direct-current potential that is electrically coupled to the power control circuit 216. In turn, the power control circuit 216 remains active and prevents electrical power from being provided to select other portions of the computer 200 during the deep standby mode.

At 308, a wake-up (i.e., full power) mode of operation is initiated. For purposes of the ongoing illustration, it is assumed that the computer 200 has received some user input by way of, for non-limiting example, button press. The computer 200 is thus beginning to reinstate a normal, full power operating mode. Other scenarios can also occur.

At 310, the co-auxiliary power supply provides an electrical current pulse to a latching relay. For purposes of illustration, the co-auxiliary power supply 224 provides an unregulated electrical pulse to the latching relay 222, enabling the latching relay 222 to assume a set (i.e., closed switch) condition. The co-auxiliary power supply 224 continues to provide three-point-three volts and five volts direct-current power in an uninterrupted manner during the provision of the electrical pulse.

At 312, the primary power supply is reenergized at the source. For purposes of illustration, it is assumed that the set condition of the latching relay 222 reconnects line utility power within the switching power supply 220. The power supply 220 is now returned to a full-power operating status.

At 314, the computer resumes normal operations. It is assumed that a return to normal (i.e., full-power) operations can include any number of required or desired operations such as, for non-limiting illustration, retrieving the most recent operating state from memory 204, reestablishment of network communications via input/output 212, uploading register contents from a non-volatile memory into the processor 202, etc.

The foregoing method is illustrative of any number of methods contemplated by the present teachings. In general, and without limitation, primary and co-auxiliary power supplies operate contemporaneously within a computer or other load device. At some point in time, a deep standby mode of operation is manually or automatically initiated. The primary power supply is disconnected from a source of line power by way of latching relay and the primary power supply is effectively de-energized. Other operations and steps in preparation for assuming the standby mode can also be performed as needed. The co-auxiliary power supply continues normal operation despite the de-energized state of the primary power supply.

At some later point in time, a wake-up (i.e., full power) mode of operation is manually or automatically initiated. The co-auxiliary power supply provides electrical energy as needed in order to perform or initiate the wake-up sequence, including provision of a pulse of energy in order to set the latching relay within the primary power supply. The primary power supply then assumes a full-power operating mode, and the computer or other load is returned to normal operating status.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An electronic circuit, comprising:
   a pair of diodes configured to define a voltage clipper;
   a transformer having a primary side and a secondary side, the primary side electrically connected across the voltage clipper;
   a voltage tripler electrically coupled to the secondary side of the transformer and configured to output an unregulated voltage; and
   a voltage regulator electrically coupled to the voltage tripler and configured to output one or more regulated direct-current voltages.

2. The electronic circuit according to claim 1 further configured to be electrically coupled to a line filter of a power supply.

3. The electronic circuit according to claim 2, the line filter defined by a pi-type line filter of a power supply.

4. The electronic circuit according to claim 1, the voltage clipper configured to limit an alternating-current voltage applied across the primary side of the transformer to not greater than about seven-tenths of a volt absolute value.

5. The electronic circuit according to claim 1, the voltage tripler including a plurality of Schottky diodes and a plurality of capacitors.

6. The electronic circuit according to claim 1, the voltage regulator comprising:
   a plurality of resistors configured to define a voltage divider;

a first transistor biased by way of the voltage divider and configured to output a first regulated direct-current voltage; and a second transistor biased by way of the voltage divider and configured to output a second regulated direct-current voltage less than the first regulated direct-current voltage.

7. The electronic circuit according to claim 6, the second transistor configured to derive the second regulated direct-current voltage from the first regulated direct-current voltage.

8. The electronic circuit according to claim 1 further comprising a diode configured to electrically couple the voltage tripler to the voltage regulator.

9. The electronic circuit according to claim 1, the voltage regulator configured such that the one or more regulated direct-current voltages are continuously provided while the voltage tripler provides an electrical current pulse to a predetermined load.

10. The electronic circuit according to claim 9, the predetermined load being defined by a latching relay.

11. The electronic circuit according to claim 1, the electronic circuit defined by a power dissipation of less than two hundred milliwatts.

12. The electronic circuit according to claim 1, the transformer defined by a primary side direct-current resistance of less than about ten Ohms.

13. A method, comprising:
clipping an alternating-current voltage applied to a primary side of a transformer using a voltage clipper;
tripling a voltage output from a secondary side of the transformer using a voltage tripler;
electrically coupling an output from the voltage tripler to a voltage regulator using a diode; and
outputting at least one regulated direct-current voltage from the voltage regulator to a load.

14. The method according to claim 13 further comprising electrically coupling the primary side of the transformer to a source of alternating-current electricity using a line filter of a power supply.

15. The method according to claim 13 further comprising providing an electrical pulse from the voltage tripler to a predetermined entity while maintaining the at least one regulated direct-current voltage output from the voltage regulator to the load.

* * * * *